(12) United States Patent  
Benish et al.

(10) Patent No.: US 9,139,207 B2  
(45) Date of Patent: Sep. 22, 2015

(54) MODULAR MONORAIL BUSS CONTROL SYSTEM AND METHOD

(75) Inventors: Ronald Jay Benish, Farmington Hills, MI (US); Robert Joseph Walkerdine, Highland, MI (US)

(73) Assignee: FATA AUTOMATION, INC., Auburn Hills, MI (US)

( * ) Notice: Subject to any disclaimer, the term of this patent is extended or adjusted under 35 U.S.C. 154(b) by 127 days.

(21) Appl. No.: 14/000,634

(22) PCT Filed: Mar. 1, 2012

(86) PCT No.: PCT/US2012/027256  
§ 371 (c)(1),  
(2), (4) Date: Aug. 27, 2013

(87) PCT Pub. No.: WO2012/121967  
PCT Pub. Date: Sep. 13, 2012

(65) Prior Publication Data  
US 2013/0333587 A1 Dec. 19, 2013

Related U.S. Application Data

(60) Provisional application No. 61/449,295, filed on Mar. 4, 2011.

(51) Int. Cl.  
*B61B 13/00* (2006.01)  
*B61B 13/04* (2006.01)  
(Continued)

(52) U.S. Cl.  
CPC . *B61B 13/04* (2013.01); *B60L 5/38* (2013.01); *B60L 13/006* (2013.01); *B61B 3/02* (2013.01); *B60L 2200/26* (2013.01); *Y02T 90/16* (2013.01); *Y10T 29/49117* (2015.01)

(58) Field of Classification Search  
CPC .......... B61B 13/00; B61B 13/04; B61B 3/02; B60L 5/38; B60L 5/005; B60L 13/006; B60L 13/00; B60L 2200/26; B60L 11/1809; B60L 11/182; B62D 1/00; B62D 1/02; B62D 1/286  
See application file for complete search history.

(56) References Cited

U.S. PATENT DOCUMENTS 4,223,611 A * 9/1980 Dawson et al. ............... 104/247  
6,622,635 B2 * 9/2003 Lund .......................... 104/88.01  
(Continued)

FOREIGN PATENT DOCUMENTS

JP 2009-284696 A 12/2009  
KR 10-2008-0016313 A 2/2008  
KR 10-2010-0062918 A 6/2010

OTHER PUBLICATIONS

International Search Report for PCT/US2012/027256, mailed Sep. 24, 2012; ISA/KR.

*Primary Examiner* — Jason C Smith  
(74) *Attorney, Agent, or Firm* — Harness, Dickey & Pierce, P.L.C.

(57) ABSTRACT

A modular, electrified monorail system upon which at least one motorized trolley assembly may be propelled along. The system may incorporate a plurality of rail assemblies adapted to be coupled adjacent to one another to form a generally continuous track. Each rail assembly may make use of an electrified track adapted to provide an electrical signal from an electrical power source to at least one electrical conductor extending coextensively along the electrified track. A controller may be mounted on the electrified track. The controller may be configured to selectively apply and remove the electrical power from the electrified track to control propulsion of the motorized trolley assembly along the electrified track.

19 Claims, 5 Drawing Sheets

(51) Int. Cl.
    *B60L 5/38*    (2006.01)
    *B60L 13/00*   (2006.01)
    *B61B 3/02*    (2006.01)

(56) References Cited

U.S. PATENT DOCUMENTS

| | | |
|---|---|---|
| 8,027,755 B2 | 9/2011 | Ohta |
| 2009/0045773 A1* | 2/2009 | Pandya et al. ............. 320/108 |
| 2010/0138082 A1* | 6/2010 | Ohta ........................... 701/2 |
| 2012/0247362 A1* | 10/2012 | Rodgers et al. ............ 104/118 |
| 2013/0081915 A1* | 4/2013 | Sommer ..................... 191/49 |
| 2013/0126287 A1* | 5/2013 | Kanemori et al. .......... 191/29 R |
| 2014/0158013 A1* | 6/2014 | Diebel ........................ 104/118 |
| 2014/0174315 A1* | 6/2014 | Camp et al. ................ 104/118 |
| 2014/0230686 A1* | 8/2014 | Camp et al. ................ 104/118 |

* cited by examiner

MODULAR MONORAIL BUSS CONTROL SYSTEM AND METHOD

CROSS-REFERENCE TO RELATED APPLICATIONS

This application is a 371 U.S. National Stage of International Application No. PCT/US2012/027256, which claims the benefit of U.S. Provisional Application No. 61/449,295, filed on Mar. 4, 2011. The entire disclosures of the above applications are incorporated hereby by reference.

FIELD

The present disclosure relates to monorail systems used in various applications, typically manufacturing and assembly operations, and more particularly to a monorail buss control system and method that can be implemented with less cost and complexity than previously developed monorail conveyor systems without sacrificing utility and efficiency of the system.

BACKGROUND

The statements in this section merely provide background information related to the present disclosure and may not constitute prior art.

Electrified monorail convey systems are often employed in assembly and manufacturing environments to move component parts from one location within an assembly environment (often a factory) to another station. Such systems generally are quieter and cleaner to operate than conveyor systems that use chains to pull part carriers along a predetermined path. However, electrified monorail conveyor systems have traditionally been fairly costly to implement, which has in some applications limited their applicability. Typical electrified monorail conveyor systems often include a plurality of tractor assemblies, sometimes referred to as "carrier" assemblies that are independently propelled along an electrified track. For simplicity these will be referred to simply as "tractor assemblies". The tractor assemblies typically carry a part or subassembly thereon from one station of an assembly or processing facility to another station. Typically each tractor assembly has its own electronic controller that is mounted thereon, and uses control signals transmitted along one or more conductors extending along the track to control motion of its associated carrier assembly. Obviously, the need to include an electronic controller for each and every carrier assembly adds significant cost to the overall system.

SUMMARY

In one aspect the present disclosure relates to a modular, electrified monorail system upon which at least one motorized trolley assembly may be propelled along. The system may incorporate a plurality of rail assemblies adapted to be coupled adjacent to one another to form a generally continuous track. Each rail assembly may make use of an electrified track adapted to provide an electrical signal from an electrical power source to at least one electrical conductor extending coextensively along the electrified track. A controller may be mounted on the electrified track. The controller may be configured to selectively apply and remove the electrical power from the electrified track to control propulsion of the motorized trolley assembly along the electrified track.

In another aspect the present disclosure relates to a modular, electrified monorail system. The system may comprise a plurality of motorized trolley assemblies which are adapted to be propelled by electrical power. A plurality of rail assemblies may be included which are adapted to be coupled adjacent to one another to form a generally continuous track. Each rail assembly may include an electrified track adapted to provide an electrical signal from an electrical power source to at least one electrical conductor extending coextensively along the electrified track. The at least one electrical conductor may be adapted to provide the electrical signal to any one of the motorized trolleys that is present the electrified track. A controller may also be mounted on the electrified track. The controller may be configured to selectively apply and remove the electrical power from the electrified track to control propulsion of each of the motorized trolley assemblies along the electrified track. A remotely located controller may be included which is in communication with the controller located on each electrified track, for communicating with the controller on each one of the electrified tracks when to apply and remove power from its associated electrified track.

In still another aspect the present disclosure may relate to a method for forming a modular electrified monorail system. The method may comprise plurality of operations including providing a plurality of motorized trolley assemblies that each may be independently propelled via electrical signals. A plurality of rail assemblies may be used which are adapted to be coupled adjacent to one another to form a generally continuous track upon which the motorized trolley assemblies may be propelled. For each rail assembly, an electrified track may be used which is adapted to provide an electrical signal from an electrical power source to at least one electrical conductor extending coextensively along the electrified track. A controller may also be used which may be mounted on the electrified track. The controller may be caused to selectively apply and remove the electrical power from the electrified track to control propulsion of the motorized trolley assembly along the electrified track. A remotely located controller may be used to communicate with each of the controllers and to inform each of the controllers specifically when to apply electrical power to its associated said electrified track, and when to remove electrical power from its associated said electrified track, to control movement of the motorized trolleys along each of the electrified tracks.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
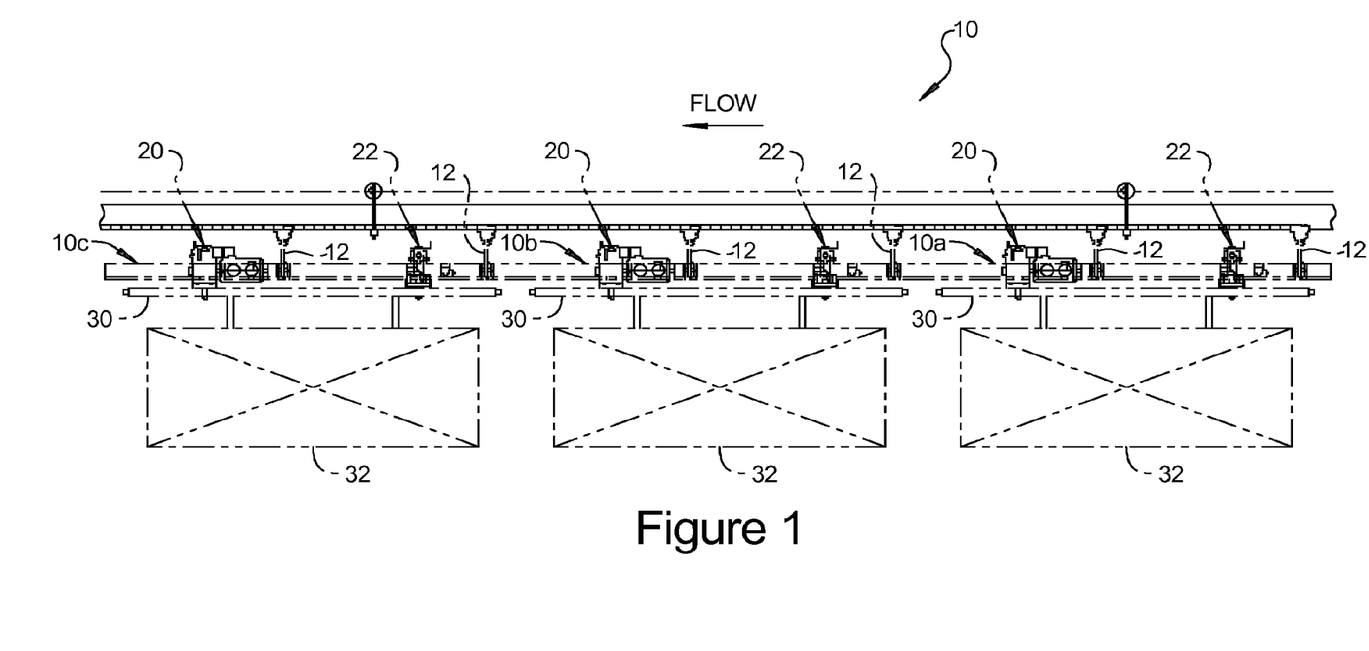
FIG. 1 is a side view of one embodiment of a modular, electrified monorail buss control rail system in accordance with the present disclosure that makes use of a plurality of modular, electrified monorail rail assemblies coupled adjacent to one another.
Figure 2:
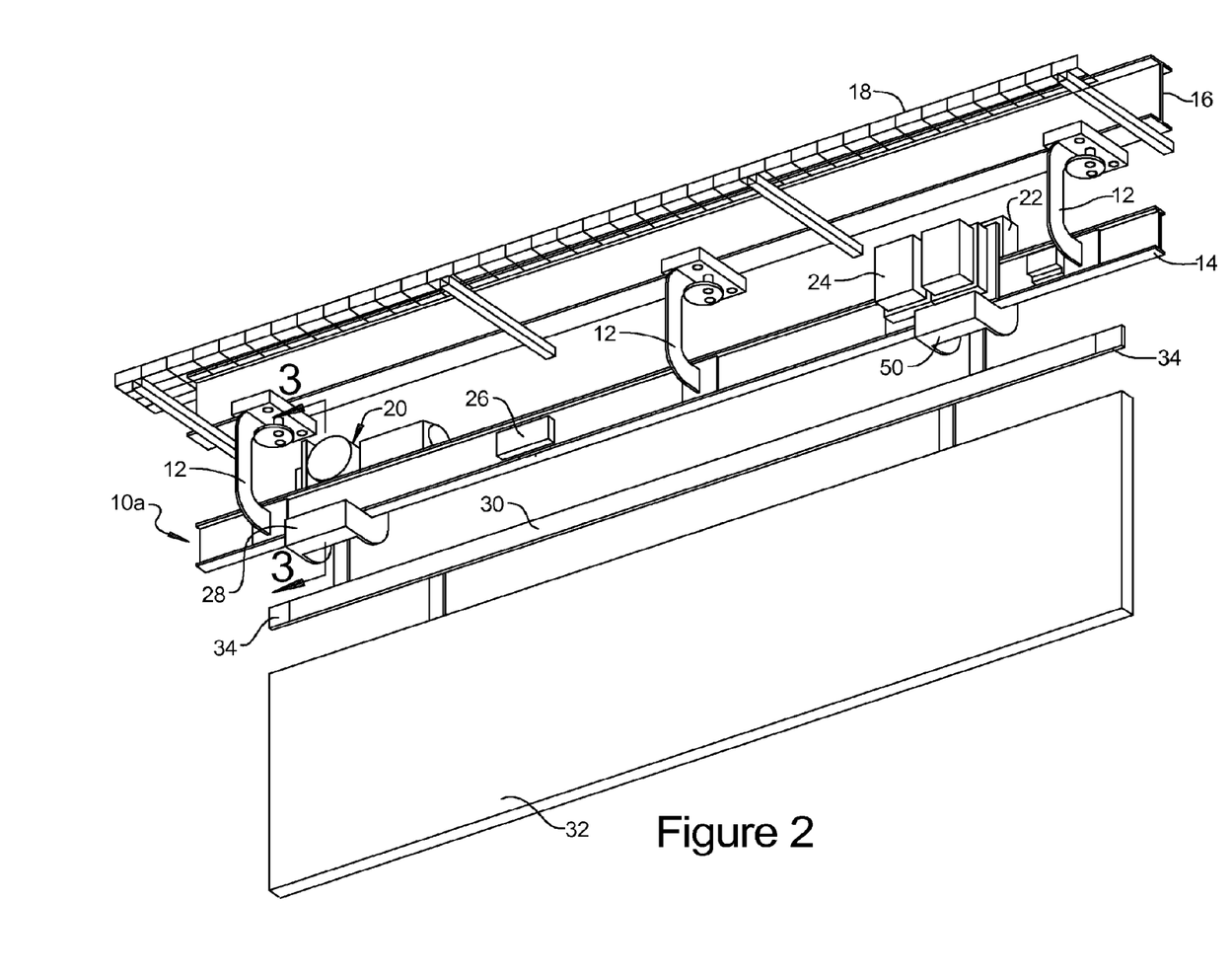
FIG. 2 is an enlarged perspective view of one of the modular rail assemblies shown in FIG. 1.

Referring to FIGS. 1 and 2, there is shown a modular, electrified, monorail system 10 that makes use of a plurality of identical electrified monorail rail assemblies 10a, 10b and 10c. For convenience the electrified monorail rail assemblies 10a-10c will be referenced simply as "rail assemblies" 10a-10c. It will also be appreciated immediately that while only three complete rail assemblies 10a-10c are shown in FIG. 1, that in a typical application dozens or even hundreds or more such assemblies 10 may be coupled adjacent to one another and used to form the needed path of travel through an assembly plant or processing plant where the system 10 is being employed. The path of travel may include long straight lengths as well as turns and elevation changes. Conventional track switches may also be employed in connection with the rail assemblies 10a-10c to route different components being carried along the rail assemblies 10a-10c to different assembly or processing stations within an assembly or processing plant.

Since the rail assemblies 10a-10c are identical in construction, only the construction of rail assembly 10a will be described in detail. Rail assembly 10a is shown in greater detail in FIG. 2 and includes a plurality of conventional yokes or hangers 12 that suspend an electrified track 14 from a support beam 16. Typically the support beam 16 may employ a cable tray 18 to hold the various electrical cables (not shown) that are used in connection with the rail assembly 10a. The cable tray 18 also supports T-couplings (not shown) where various electrical connections are made between the rail assembly 10a components and the electrical cables running along the support beam 16.

The rail assembly 10a may also include a trolley assembly 20 in addition to an idler assembly 22. Optionally, a plurality of idler assemblies 22 may be employed, which may depend in part on the overall length of the rail assembly 10a and a load which it is expected to carry. A controller 24 is mounted on the track 14 in a manner that does not interfere with movement of the trolley assembly 20 and the idler assembly 22. The controller 24, in one embodiment, may be a well known integrated distributed controller that assists in controlling motion of the trolley assembly 20 and the idler assembly 22. However, the system 10 is not limited to use only with integrated distributed controllers but rather may incorporate any other suitable form of controller capable of controlling the application of electrical power to the track 14.

The rail assembly 10a also include a first switch or sensor 26 and a second switch or sensor 28. The first sensor 26 may also be viewed as a "clear" sensor because it senses the arrival of one of the trolley assemblies 20 as the trolley assembly moves along the track 14 of each rail assembly 10. Clear sensor 26 indicates to the prior rail assembly (i.e., the rail system "upstream" of rail system 10a) that rail system 10a is clear to receive a trolley assembly 20. The second sensor 28 may be viewed as a "stop" sensor because it senses the trolley assembly 20 and turns power off to rail assembly 10 to stop the trolley assembly 20. Sensors 26 and 28 may be conventional proximity sensors or any other suitable form of sensor or switch.

Referring further to FIG. 2, each rail assembly 10a-10c may also include a load bar 30 that supports a carrier 32 therefrom. The carrier 32 may be specifically adapted to hold one or more of a particular type of part. The load bar 30 may include conventional rubber bumpers 34 at opposing longitudinal ends thereof to cushion and protect the load bar.

An important advantage of the system 10 is that the rail assemblies 10a-10c are modular in construction. By "modular" it is meant that each includes its own controller 24 and its own sensor 26 and 28, in addition to all T-connectors that enable it to be quickly and efficiently coupled to the electrical cabling extending along the support beam 16. By providing each track 14 with its own controller 24, rather than including a separate controller on each trolley assembly 20, a significant cost savings is realized without compromising the overall utility of the system 10. The rail assemblies 10a-10c may be provided in any suitable length that will be dictated at least in part by the needs of the specific application. However, it is anticipated that the rail assemblies 10a-10c, in many applications, will each have an overall length between about four to six meters.

Figure 3:
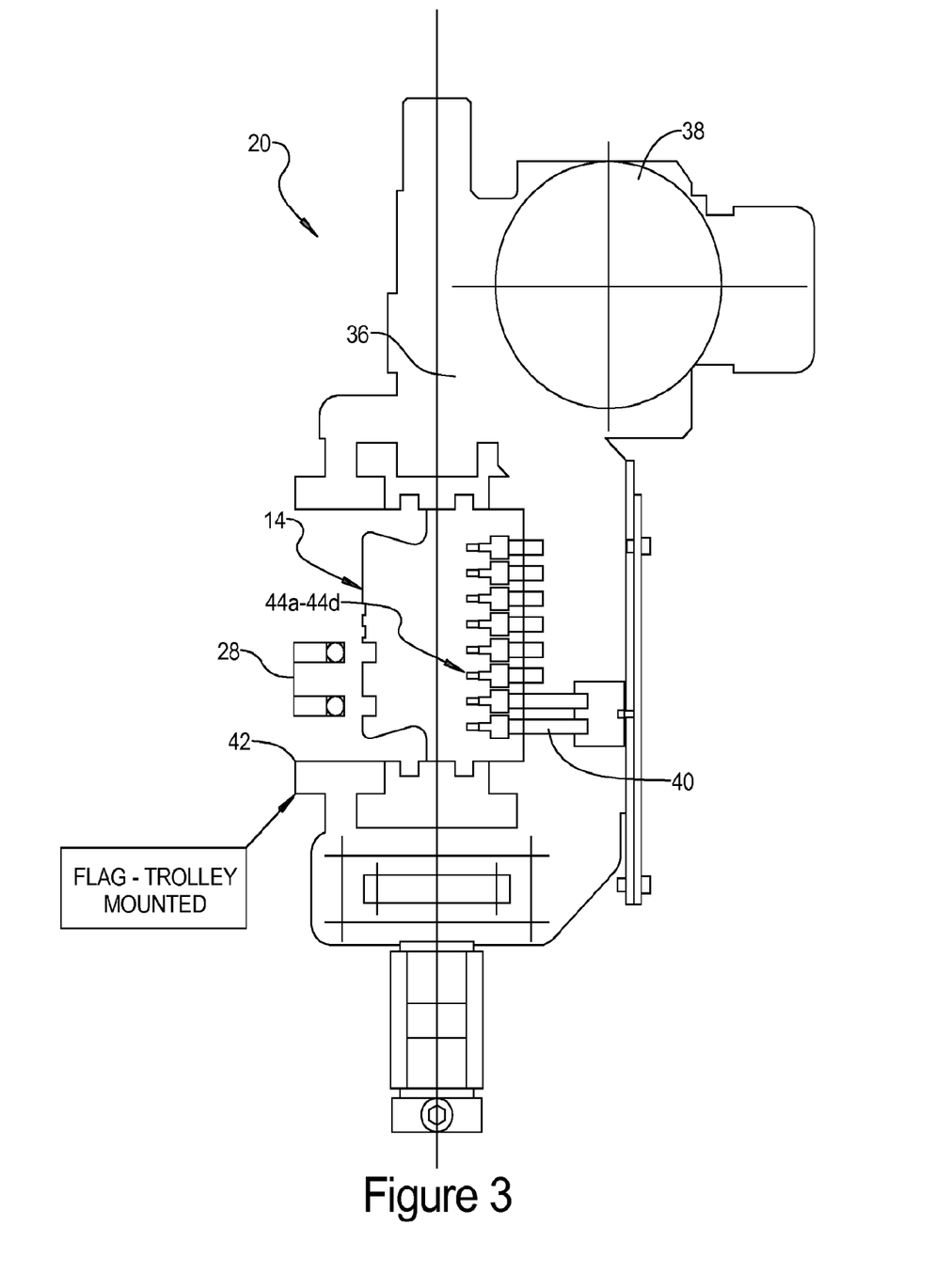
FIG. 3 is a simplified cross sectional view one of the trolley assemblies of the system taken along section line 3-3 in FIG. 2.

With brief reference to FIG. 3 a simplified cross-sectional view of the trolley assembly 20 is shown. The trolley assembly 20 may be viewed as a "drive" trolley because it provides the motive force to propel the load bar 30 and the carrier 32 along the tracks 14 of the track assemblies 10a-10c. The trolley assembly 20 may include a frame portion 36 that supports a gear motor 38 thereon. The gear motor 38 is powered by a suitable power signal applied along electrified buss bars that extend along the track 14 of each rail assembly 10a-10c. An exemplary power signal may be a 480 VAC power signal, although signals of other magnitudes may also be used. The frame portion 36 also includes a brush plate 40 and a sensor flag 42. The sensor flag 42 is used to trip the sensors 26 and 28 as the trolley assembly 20 moves along the track 14. The brush plate 40 engages a plurality of electrified buss bars 44a-44c, as well as a ground buss bar 44d, that extend along the track 14. Upper and lower wheels 46 and 48 rotationally supported from the frame portion 36 enable smooth rolling motion of the trolley assembly 20 along the track. With brief reference to FIG. 2, idler assembly 22 is a conventional component that includes a plurality of wheels supported from a frame portion 50 which enable rolling motion along the track 14. The load bar 30 is fixedly secured to the frame portions 36 and 50 so that the trolley assembly 20, the idler assembly 22, the load bar 30 and the carrier 32 form a single assembly that is propelled along the track 14 of each rail assembly 10a-10c by the gear motor 38.

Figure 4:
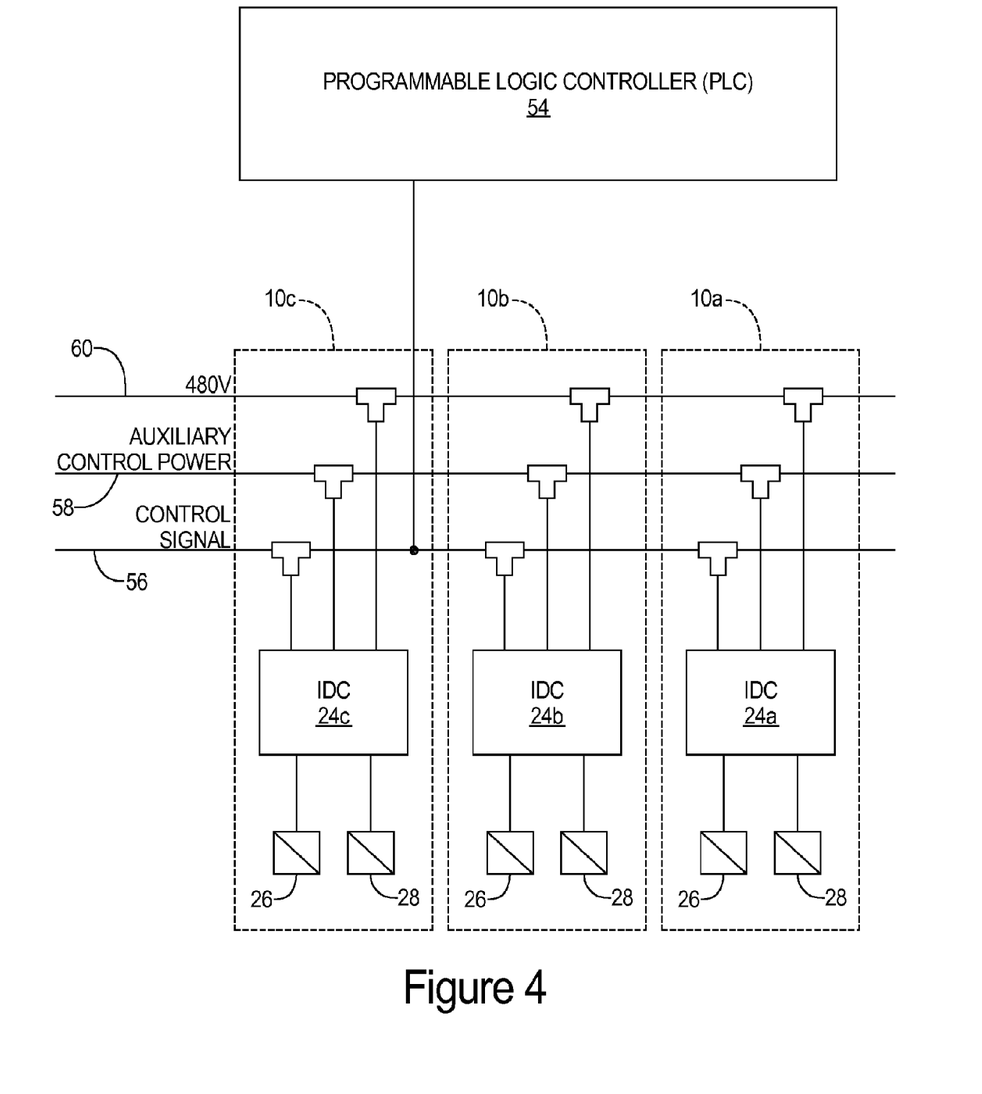
FIG. 4 is a simplified electrical schematic diagram showing how a logic controller is electrically in communication with each of the controllers of the rail assemblies.

Referring briefly to FIG. 4, a high level electrical schematic diagram is shown of rail assemblies 10a-10c. A controller, for example a programmable logic controller 54 (hereinafter simply the "logic controller" 54), applies control signals to a control signal buss 56 that may in turn provide the signals to the controller 24 on each track 14 to assist the controller 24 in turning on and off power to its high power buss bars. An auxiliary control power signal (e.g., a 120 VAC signal) may be applied on a power buss 58 to power the controllers 24 mounted on each track 14. A high voltage, three phase power signal may be applied on a power buss 60 that communicates with buss bars 44a-44c (i.e., a three phase electrical signal using three buss bars for the three phases and one buss bar (44d) for ground) on the track 14. The first and second sensors 26 and 28 of each track 14 are also electrically coupled to the controller 24 of their associated track 14. T-couplings 62 and other plug in cables (not shown) are used as needed to make the required connections between the electrical cables and the controller 24 of each track 14.

Figure 5:
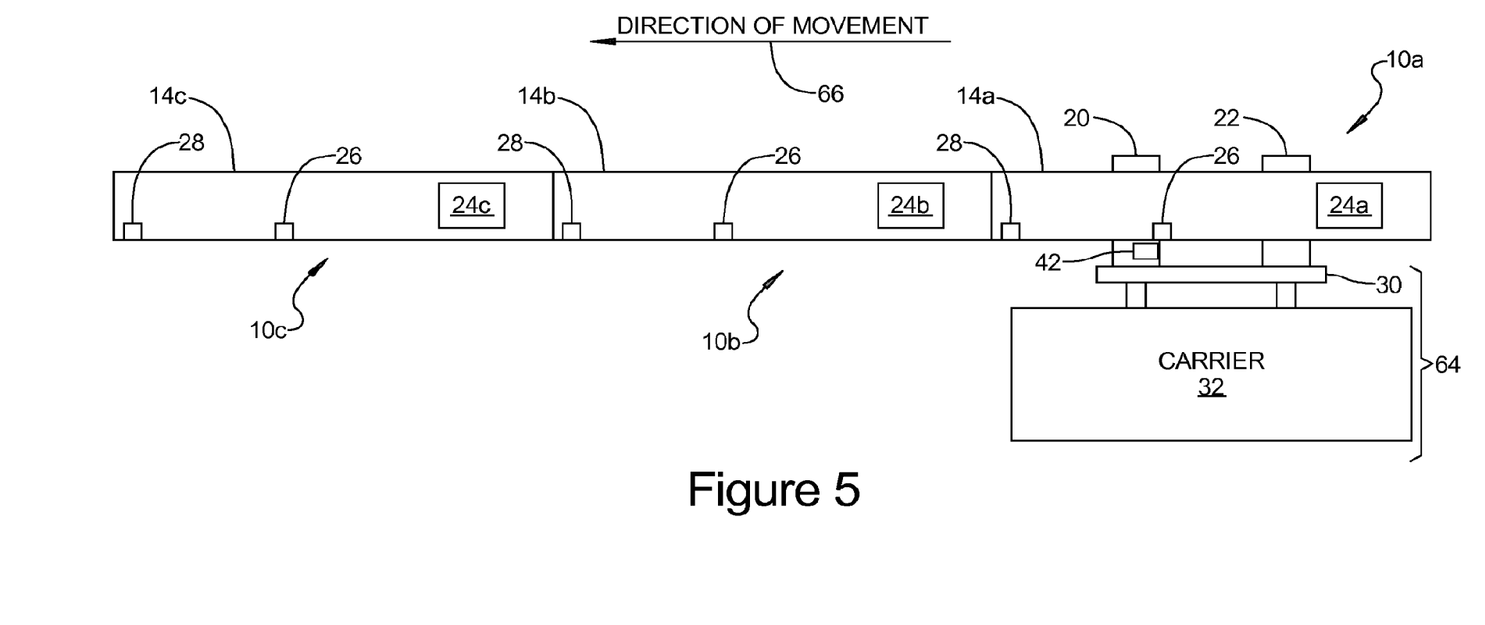
FIG. 5 is a diagram illustrating how movement of a trolley assembly occurs along a plurality of the rail assemblies.

With reference to FIG. 5, a sequence of operation of the system 10 will now be provided. For the purpose of discussion, the components including the trolley assembly 20, the idler assembly 22, the load bar 30 and the carrier 32 will be referred to collectively as the "carrier assembly" 64. In operation, the carrier assembly 64 may initially be present on track 14a of rail assembly 10a. The controller 24 on rail assembly 10c may supply a signal to the logic controller 54 (FIG. 3) indicating that track 14b is clear to accept carrier assembly 64. The controller 24 on track 14c knows this because a carrier assembly moving from track 14b to 14c actuated the track 14c clear sensor 26 (i.e., sensing the presence of a carrier assembly). The logic controller 54 then applies a control signal to the controller 24a of track 14a and the controller 24b of track 14b instructing both controllers 24a,24b to apply power to their high power buss bars (e.g., buss bars 44a-44c). This simultaneously causes the controllers 24a and 24b to turn on power to their respective high power buss bars 44a-44c. When this occurs, power is applied through the high power buss bars 44a-44c to gear motor 38 causing gear motor 38 to begin propelling the carrier assembly 64 in the direction of arrow 66. The flag 42 mounted on the trolley assembly 20 will pass stop sensor 28 on track 14a which informs the controller 24a that the carrier assembly 64 is moving off of the track 14a. The carrier assembly 64 will continue to travel to track 14b. When the carrier assembly 64 passes the clear sensor 26 on track 14b, then this information is sent to logic controller 54 which tells the controller 24a to turn off power to the high power buss bars 44a-44c on track 14a if there is no carrier assembly present on the prior (i.e., upstream) track. However, power at this time remains turned on to the high power buss bars 44a-44c of track 14b by controller 24b, which continues to power the gear motor 38 along the track 14b. When the flag 42 trips the stop sensor 28 on track 14b, the controller 24b turns off the high power signal to its high power buss bars 44a-44c, and the carrier assembly 64 will quickly coast to a stop within a predetermined distance after power is removed from the gear motor 38.

Preferably, the flag 42 is selected to have a physical length such that the carrier assembly 64 will come to a complete stop within the length of the flag 42. When the clear sensor 26 on track 14b is tripped by the flag 42, the controller 24b on track 14b will send a signal to the logic controller 54 on the control buss 56 (FIG. 4). This signal indicates to the logic controller 54 that the carrier assembly 64 is presently located on its track 14b and that track 14a is clear to accept a carrier assembly 64. The above sequence of operation then will be repeated but for rail assemblies 10c and 10b. Thus, the logic controller 54 will send a signal to the controller 24c of rail assembly 10c and to the controller 24b of rail assembly 10b that the carrier assembly 64 may be moved onto rail assembly 10c. The controller 24b will then apply power to its high power buss bars 44a-44c on track 14b while controller 24c applies power to its high power buss bars 44a-44c on track 14c. The gear motor 38 will then propel the carrier assembly 64 from track 14b to track 14c.

From the foregoing it will be appreciated that the system 10 provides a highly cost efficient alternative to traditional electrified monorail assemblies that require the use of a dedicated controller on each carrier assembly. The present system 10 and method, because of its significantly lower cost and ease of installation, is expected to find utility in many applications where a traditional electrified monorail assembly would have been too costly to implement. Furthermore, since the system 10 is modular in its construction, the rail assemblies can easily be made to specific lengths to suit the particular needs of each application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A modular, electrified monorail system upon which at least one motorized trolley may be propelled along, the system comprising:
    a plurality of rail assemblies adapted to be coupled adjacent to one another to form a generally continuous track, each said rail assembly including:
        an electrified track adapted to provide an electrical signal from an electrical power source to at least one electrical conductor extending coextensively along the electrified track;
        a controller mounted on the electrified track;
        the controller configured to selectively apply and remove the electrical power from the electrified track to control propulsion of the motorized trolley along the electrified track; and;
    at least one sensor operably associated with the electrified track for sensing the at least one motorized trolley, and further being in communication with the controller, the at least one sensor providing a signal to the controller to help the controller control the application of electrical power to the electrified track while the at least one motorized trolley is at least partially present on the electrified track.

2. The modular system of claim 1, further comprising a remotely located controller in communication with the controller located on each said electrified track, for communicating with the controller on each one of said electrified tracks when to apply and remove power from its associated said electrified track.

3. The modular system of claim 1, further comprising a plurality of the at least one sensors, each said sensor of the plurality of the at least one sensor being positioned adjacent an associated one of the electrified tracks, and in communication with the controller of its said associated electrified track, for generating a signal when the motorized trolley has left its said associated electrified track.

4. The modular system of claim 1, wherein the at least one sensor comprises a plurality of sensors, each said sensor being positioned adjacent a longitudinal edge of an associated one of the electrified tracks, and each said sensor being in communication with the controller of its said associated electrified track, for informing the controller of its said associated electrified track when to turn on and off electrical power to its said associated electrified track.

5. The system of claim 1, wherein the at least one sensor comprises:
    a plurality of first sensors, each said first sensor being positioned adjacent a longitudinal edge of an associated one of the electrified tracks, and each said first sensor being in communication with the controller of its said associated electrified track, for informing the controller of an arrival of the motorized trolley on its said associated electrified track; and
    a plurality of second sensors, each said second sensor being positioned adjacent a longitudinal edge of an associated one of the electrified tracks, and each said second sensor being in communication with the controller of its said associated electrified track, for informing the controller of its said associated electrified track to turn on and off power to said associated electrified track; and
    wherein the first sensor and the second sensor on each said electrified track are located such that the first sensor is upstream, relative to a direction of travel of the motorized trolley, of the second sensor.

6. The system of claim 5, wherein the controller on said associated electrified track communicates information to the remotely located controller, based on signals from the first and second sensors, that the remotely located controller uses to inform an immediately upstream one of the electrified tracks that said associated electrified track is free to receive another one of the motorized trolleys.

7. The system of claim 1, wherein the at least one electrical conductor comprises an electrical bus bar.

8. The system of claim 1, wherein the at least one conductor comprises a control bus bar for carrying control signals to each of the controllers on each of the electrified tracks.

9. The system of claim 1, wherein the at least one electrical conductor comprises a plurality of electrical bus bars extending generally parallel to one another along a surface of the electrified track, and adapted to make physical contact with a portion of the motorized trolley to thus transfer electrical power from at least one of an AC power source or a DC power source to the motorized trolley to propel the motorized trolley along the electrified track.

10. The system of claim 1, wherein the rail assembly further includes at least one hanger for supporting the electrified track from an external support beam.

11. The system of claim 1, wherein the system further includes the motorized trolley, and wherein the motorized trolley includes structure for making electrical contact with a portion of the electrified track without impeding movement of the motorized trolley.

12. The system of claim 11, further including:
a load bar extending from the motorized trolley; and
an idler assembly coupled to the load bar and configured to roll along the electrified track when the motorized trolley is being propelled along the electrified track.

13. A modular, electrified monorail system comprising:
a plurality of motorized trolleys which are adapted to be propelled by electrical power;
a plurality of rail assemblies adapted to be coupled adjacent to one another to form a generally continuous track upon which the motorized trolleys move, each said rail assembly including:
an electrified track adapted to provide an electrical signal from an electrical power source to at least one electrical conductor extending coextensively along the electrified track, the at least one electrical conductor adapted to provide the electrical signal to any one of said motorized trolleys that is present the electrified track;
a controller mounted on the electrified track, the controller configured to selectively apply and remove the electrical power from the electrified track to control propulsion of each of the motorized trolleys along the electrified track;
at least one sensor operably associated with the electrified track for sensing at least one of the motorized trolleys, and further being in communication with the controller, the at least one sensor providing a signal to the controller to help the controller control the application of electrical power to the electrified track while the at least motorized trolley is at least partially present on the electrified track; and
a remotely located controller in communication with the controller located on each said electrified track, for communicating with the controller on each one of said electrified tracks when to apply and remove power from its associated said electrified track.

14. The system of claim 13, wherein the electrified track includes a plurality of parallel extending buss bars for carrying an electrical power signal.

15. The system of claim 13, wherein the at least one sensor includes a first sensor for determining when it is free to receive one of the motorized trolleys from an immediately upstream one of the electrified tracks, and a second sensor that detects when a given one of the motorized trolleys that was present thereon has moved off of and onto an immediately downstream one of the electrified tracks; and
wherein both of said first and second sensors are in communication with the controller.

16. A method for forming a modular electrified monorail system, the method comprising:
providing a plurality of motorized trolleys that each may be independently propelled via electrical signals:
using a plurality of rail assemblies adapted to be coupled adjacent to one another to form a generally continuous track upon which the motorized trolleys may be propelled;
for each said rail assembly:
using an electrified track adapted to provide an electrical signal from an electrical power source to at least one electrical conductor extending coextensively along the electrified track;
providing a controller mounted on the electrified track; and
causing the controller to selectively apply and remove the electrical power from the electrified track to control propulsion of the motorized trolleys along the electrified track;
using at least one sensor operably associated with the electrified track for sensing at least one of the motorized trolleys, and further being in communication with the controller, the at least one sensor providing a signal to the controller to help the controller control the application of electrical power to the electrified track while the at least motorized trolley is at least partially present on the electrified track; and
using a remotely located controller to communicate with each of the controllers and to inform each of the controllers specifically when to apply electrical power to its associated said electrified track, and when to remove electrical power from its associated said electrified track.

17. The method of claim 16, wherein the operation of using a sensor comprises using a first sensor on each of said electrified tracks to communicate to its associated said controller that it is free to receive another one of the motorized trolleys from an immediately upstream one of the electrified tracks.

18. The method of claim 17, wherein the operation of using a sensor further comprises using a second sensor on each of said electrified tracks to communicate with its associated said controller that a given one of the motorized trolleys has moved off of its associated said electrified track onto an immediately downstream one of the electrified tracks.

19. A modular, electrified monorail system upon which at least one motorized trolley may be propelled along, the system comprising:
a plurality of rail assemblies adapted to be coupled adjacent to one another to form a generally continuous track, each said rail assembly including:
an electrified track adapted to provide an electrical signal from an electrical power source to at least one electrical conductor extending coextensively along the electrified track;
a controller mounted on the electrified track;

the controller configured to selectively apply and remove the electrical power from the electrified track to control propulsion of the motorized trolley along the electrified track; and a plurality of sensors, each said sensor being positioned adjacent a longitudinal edge of an associated one of the electrified tracks, and each said sensor being in communication with the controller of its said associated electrified track, for informing the controller of its said associated electrified track when to turn on and off electrical power to its said associated electrified track.

* * * * *